United States Patent
Nam et al.

(10) Patent No.: US 12,433,442 B2
(45) Date of Patent: Oct. 7, 2025

(54) ELECTRIC PRESSURE COOKER TO PREVENT CLOGGING OF STEAM EXHAUST FLOW PATH

(71) Applicant: LG Electronics Inc., Seoul (KR)

(72) Inventors: Hyeunsik Nam, Seoul (KR); Wan Soo Kim, Seoul (KR); Byungkyu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 917 days.

(21) Appl. No.: 16/780,591

(22) Filed: Feb. 3, 2020

(65) Prior Publication Data

US 2020/0260901 A1    Aug. 20, 2020

(30) Foreign Application Priority Data

Feb. 20, 2019   (KR) .................. 10-2019-0020144

(51) Int. Cl.
  *A47J 27/08*    (2006.01)
  *A47J 27/00*    (2006.01)
  *A47J 27/09*    (2006.01)

(52) U.S. Cl.
  CPC ......... *A47J 27/0815* (2013.01); *A47J 27/002* (2013.01); *A47J 27/09* (2013.01)

(58) Field of Classification Search
  CPC .. A47J 27/0802; A47J 27/0813; A47J 27/092; A47J 27/0804; A47J 27/0806; A47J 27/09; A47J 36/062; A47J 36/38
  USPC ......................................................... 99/337
  See application file for complete search history.

(56) References Cited

U.S. PATENT DOCUMENTS

| | | | |
|---|---|---|---|
| 11,197,573 B2 * | 12/2021 | Peng | A47J 27/092 |
| 2006/0254429 A1 * | 11/2006 | Sinton | A47J 27/004 |
| | | | 99/348 |
| 2008/0142498 A1 * | 6/2008 | He | A47J 27/09 |
| | | | 219/442 |
| 2015/0312969 A1 * | 10/2015 | Hazir | H05B 6/062 |
| | | | 219/621 |

(Continued)

FOREIGN PATENT DOCUMENTS

| | | |
|---|---|---|
| CN | 1676077 | 10/2005 |
| CN | 105615618 | 6/2016 |

(Continued)

OTHER PUBLICATIONS

Search (Year: 2022).*

(Continued)

*Primary Examiner* — Thien S Tran
(74) *Attorney, Agent, or Firm* — Fish & Richardson P.C.

(57) ABSTRACT

An electric pressure cooker includes: a main body; an inner pot configured to be accommodated in the main body; a lid fastening ring configured to be fastened to an upper surface of the main body; an inner lid that is disposed radially inside of the lid fastening ring and that includes a steam outlet and a first flow path guide member that are disposed at a lower surface of the inner lid; and an inside lid that is configured to be coupled to the lower surface of the inner lid and that includes a second flow path guide member disposed at an upper surface of the inside lid. The inner lid and the inside lid define a steam flow path configured guide steam generated in the inner pot to the steam outlet by the first flow path guide member and the second flow path guide member.

20 Claims, 15 Drawing Sheets

(56) References Cited

U.S. PATENT DOCUMENTS

2019/0167028 A1* 6/2019 Wang ................. A47J 36/06

FOREIGN PATENT DOCUMENTS

| | | | |
|---|---|---|---|
| JP | 3363373 | * | 10/2002 |
| JP | 2003310430 | | 11/2003 |
| JP | 3641827 | * | 2/2005 |
| KR | 970053415 | | 10/1997 |
| KR | 20000005296 | | 3/2000 |
| KR | 2020000005296 | * | 3/2000 |
| KR | 20000020114 | * | 11/2000 |
| KR | 200310050 | | 4/2003 |
| KR | 20080003561 | | 8/2008 |
| KR | 20090019332 | * | 2/2009 |
| KR | 20100010793 | | 11/2010 |
| KR | 10-1225101 | | 1/2013 |
| KR | 20140080128 | | 6/2014 |

OTHER PUBLICATIONS

Trans '548 (Year 2022) (Year: 2022).*
Trans '332 Year 2022) (Year: 2022).*
Translation JPH1118928 (Year: 2022).*
Translation Cuckoo KR 200442116 (Year: 2022).*
JP3641827 (Year: 2024).*
JP3363373 (Year: 2024).*
Extended European Search Report in European Appln. No. 20151648.1, dated Jun. 5, 2020, 6 pages.
PCT International Search Report in International Appln. No. PCT/KR2020/001565, dated May 21, 2020, 7 pages (with English translation).
Office Action in Chinese Appln. No. 202080015314.2, dated Jan. 12, 2022, 13 pages (with English translation).
Notice of Allowance in Korean Appln. No. 10-2019-0020144, mailed on Jan. 18, 2024, 5 pages (with English translation).

* cited by examiner

RELATED ART

RELATED ART

ELECTRIC PRESSURE COOKER TO PREVENT CLOGGING OF STEAM EXHAUST FLOW PATH

CROSS-REFERENCE TO RELATED APPLICATION

The present disclosure claims priority to and the benefit of Korean Patent Application No. 10-2019-0020144, filed on Feb. 20, 2019, the disclosure of which is incorporated herein by reference in its entirety.

TECHNICAL FIELD

The present disclosure relates to an electric pressure cooker that may prevent a steam exhaust flow path from being clogged during cooking.

BACKGROUND

Electric pressure cookers may cook various types of grains such as rice and may exhaust steam through a steam exhaust flow path based on pressure of steam generated in electric pressure cookers being identical to or greater than a predetermined pressure level or based on completion of cooking food.

In some cases, the steam exhausted through the steam exhaust flow path may include rice water and alien substances. For instance, when the steam is exhausted, relatively dense rice water or alien substances may be deposited on the steam exhaust flow path.

As an amount of deposit deposited on the steam exhaust flow path increases, the steam exhaust flow path may become narrow or may be clogged due to the deposit, in which the high-pressure steam inside the electric pressure cooker may not be exhausted.

In some cases, failure of exhausting the high-pressure steam may cause damage to the electric pressure cooker, and, in severe cases, may cause an explosion and fire of the electric pressure cooker.

FIGS. 1 and 2 respectively show a lid structure used for an electric pressure cooker in related art.

Referring to FIGS. 1 and 2, an inside lid 5 may be detachably assembled with an inner lid 3 to prevent cooking contents from being directly scattered to a steam outlet 4 during or after cooking, thereby preventing clogging of the steam outlet 4. Further, the inside lid 5 may be detachably assembled with the inner lid 3 to prevent rice water from being overflowing to outside of a cooker even when the steam is forcedly exhausted due to power failure during cooking or stopping of cooking.

In some cases, as shown in FIG. 2, a plurality of steam exhausting holes may be defined in the inside lid 5 so that the steam is exhausted through the steam outlet between the steam exhausting hole of the inside lid 5 and the steam outlet disposed in the inner lid 3 even when the inner lid 3 is coupled to the inside lid 5.

In some examples, the inner lid may prevent steam from being directly introduced into the steam outlet, thereby partially preventing the clogging of the steam outlet. In related art, the inner lid merely functions to primarily block the steam, but the inner lid itself may not filter the rice water and alien substances included in the steam.

In some cases, the cooking contents may be prevented from being directly introduced into the steam outlet or the rice water and thus may be prevented from being boiled over the steam outlet; however, in some cases, the rice water and the alien substances included in the steam may not be removed, so that the rice water and the alien substances may be deposited in the steam outlet during exhausting of steam.

SUMMARY

The present disclosure describes a steam exhaust flow path that may be prevented from being clogged by rice water generated during cooking.

The present disclosure also describes a steam flow path that may be defined to circulate steam between an inside lid and an inner lid.

The present disclosure may provide convenience of coupling between the inside lid and the inner lid to define a steam flow path.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and the advantages of the present disclosure may be implemented by features described in claims and a combination thereof.

According to one aspect of the subject matter described in this application, an electric pressure cooker includes: a main body that defines a cooking space and that has an upper surface that defines a body opening; an inner pot that is configured to be accommodated in the cooking space and that has an upper surface that defines a pot opening; a lid fastening ring configured to be fastened to the upper surface of the main body; an inner lid that is disposed radially inside of the lid fastening ring and that is configured to block the upper surface of the inner pot, in which the inner lid includes a steam outlet and a first flow path guide member that are disposed at a lower surface of the inner lid; and an inside lid configured to be coupled to the lower surface of the inner lid, in which the inside lid includes a second flow path guide member disposed at an upper surface of the inside lid. The inner lid and the inside lid define a steam flow path by the first flow path guide member and the second flow path guide member, and the steam flow path is configured guide steam generated in the inner pot to the steam outlet.

Implementations according to this aspect may include one or more of the following features. For example, the electric pressure cooker may further include an inner pot packing that is configured to be installed to the inner lid along a circumference of the inner pot, where the inner pot packing may be configured to cover a space between the inner lid and the inner pot. In some examples, the main body may include a body fastening ring disposed at the upper surface of the main body, and the lid fastening ring may be configured to be rotationally fastened to the body fastening ring.

In some examples, the main body may define a fastening groove in the body fastening ring, and the lid fastening ring may be configured to be inserted into the fastening groove and then rotated relative to the body fastening ring to thereby be fastened to the body fastening ring. In some examples, the lid fastening ring may include a plurality of engaging portions, and the body fastening ring may include a plurality of guide protrusions that are configured to, based on the lid fastening ring being inserted into the fastening groove and then rotated relative to the body fastening ring, engage with the plurality of engaging portions, respectively.

In some implementations, the electric pressure cooker may further include a steam exhauster disposed at an upper surface of the inner lid and configured to discharge steam to an outside of the electric pressure cooker according to a user command. In some implementations, the electric pressure cooker may further include a pressure controller disposed at an upper surface of the inner lid and configured to discharge steam to an outside of the electric pressure cooker based on a pressure of steam introduced through the steam outlet exceeding a preset pressure.

In some implementations, the electric pressure cooker may further include: a fastening boss disposed at the lower surface of the inner lid; and a packing member disposed in the inside lid, where the inside lid is configured to be coupled to the lower surface of the inner lid based on the fastening boss being inserted through the packing member.

In some implementations, the first flow path guide member may include a flow path guide wall that protrudes from the lower surface of the inner lid and that is configured to contact the upper surface of the inside lid, the flow path guide wall being curved to define the steam flow path in a horizontal zigzag shape.

In some implementations, the first flow path guide member may protrude downward from the lower surface of the inner lid, and the second flow path guide member may protrude upward from the upper surface of the inside lid.

In some implementations, the first flow path guide member may include a first circular flow path guide wall that protrudes downward from the lower surface of the inner lid, and the first circular flow path guide wall having a first radius, and the second flow path guide member may include a second circular flow path guide wall that protrudes upward from the upper surface of the inside lid and that is concentric with the first circular flow path guide wall. The second circular flow path guide wall may have a second radius that is different from the first radius, and the first circular flow path guide wall and the second circular flow path guide wall may define the steam flow path in a vertical zigzag shape.

In some examples, the steam outlet may extend along a vertical line, and a center of the first circular flow path guide wall and a center of the second circular flow path guide wall are defined in the vertical line. In some examples, a lower end of the first circular flow path guide wall may be spaced apart from the upper surface of the inside lid, and an upper end of the second circular flow path guide wall may be spaced apart from the lower surface of the inner lid.

In some implementations, the first flow path guide member may include a spiral flow path guide wall that has an inlet defined at one side, that protrudes from the lower surface of the inner lid, and that is configured to contact the upper surface of the inside lid, the spiral flow path guide wall having a first radius, and the second flow path guide member defines a circular depression that is concentric with the spiral flow path guide wall. The circular depression may have a second radius that is less than the first radius, and the spiral flow path guide wall and the circular depression may define the steam flow path in a spiral shape. In some examples, a center of the spiral flow path guide wall may be defined at the steam outlet.

In some implementations, the electric pressure cooker may further include a coupling guide boss that protrudes from the lower surface of the inner lid. The inside lid may define a coupling guide hole configured to receive the coupling guide boss, and the first flow path guide member and the second flow path guide member may define the steam flow path based on the coupling guide boss being inserted into the coupling guide hole.

In some implementations, the electric pressure cooker may further include: a fastening boss disposed at the lower surface of the inner lid and spaced apart from the coupling guide boss; and a packing member disposed in the inside lid and configured to receive the fastening boss. In some examples, the coupling guide boss may be disposed radially outward relative to the fastening boss at the lower surface of the inner lid.

In some implementations, the steam outlet may include a plurality of steam outlets spaced apart from each other, and the steam flow path may pass through at least one of the plurality of steam outlets. In some implementations, the first flow path guide member and the second flow path guide member may be configured to, based on the inner lid and the inside lid being coupled to each other, be horizontally or vertically spaced apart from each other to thereby define the steam flow path therebetween.

In some implementations, the rice water or the alien substances included in the steam generated inside of an inner pot may be removed through the curved steam flow path and the steam may be exhausted to outside, thereby preventing the steam exhaust flow path from being clogged by the rice water generated during cooking.

In some implementations, the steam flow path may be defined in various shapes using flow path guide members disposed on a lower surface of the inner lid and an upper surface of the inside lid so that the steam may be circulated between the inside lid and the inner lid. In some implementations, a coupling guide boss may be defined on the lower surface of the inner lid and a coupling guide hole may be defined in the inside lid, and the coupling guide boss may be inserted into the coupling guide hole, thereby providing convenience in coupling between the inside lid and the inner lid to define the steam flow path.

In some implementations, the steam exhaust flow path may be prevented from being clogged by the rice water, thereby preventing safety risks, for example, explosion of the electric pressure cooker occurring due to the clogging of the steam exhaust flow path and fire occurring due to the explosion of the electric pressure cooker.

In some implementations, the steam flow path may be defined to circulate the steam between the inside lid and the inner lid to filter the rice water or the alien substances in the steam in the steam flow path and to wash the inside lid by separating the inside lid, thereby easily processing the rice water or the alien substances deposited in the steam flow path.

Further, the present disclosure may provide convenience in coupling between the inside lid and the inner side to define the steam flow path so that the steam flow path may be defined at an accurate position.

A specific effect of the present disclosure, further to the above-mentioned effect, is described together while describing specific matters to implement the present disclosure.

DETAILED DESCRIPTION

Figure 1:
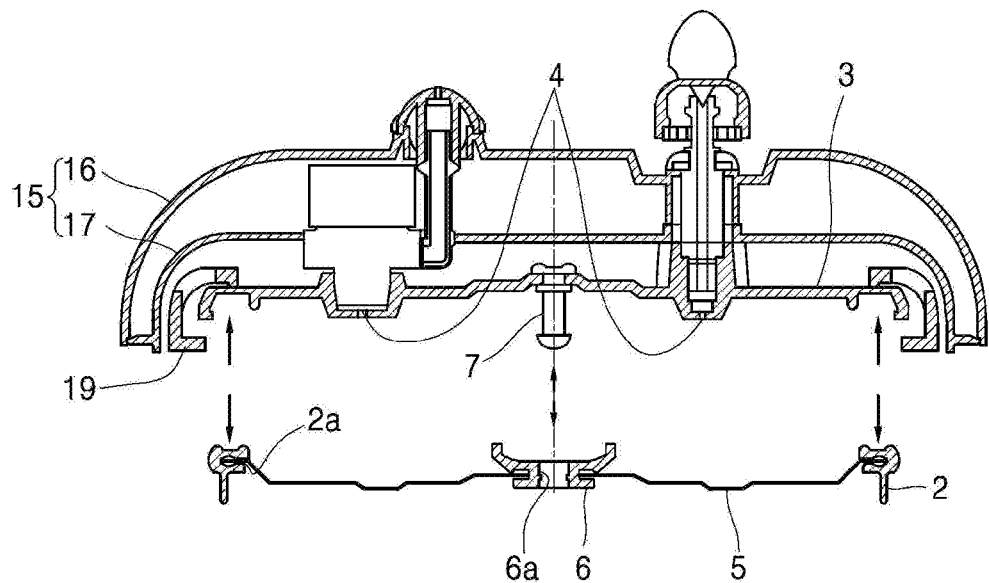
FIGS. 1 and 2 respectively show a lid structure used for an electric pressure cooker in related art.
Figure 2:
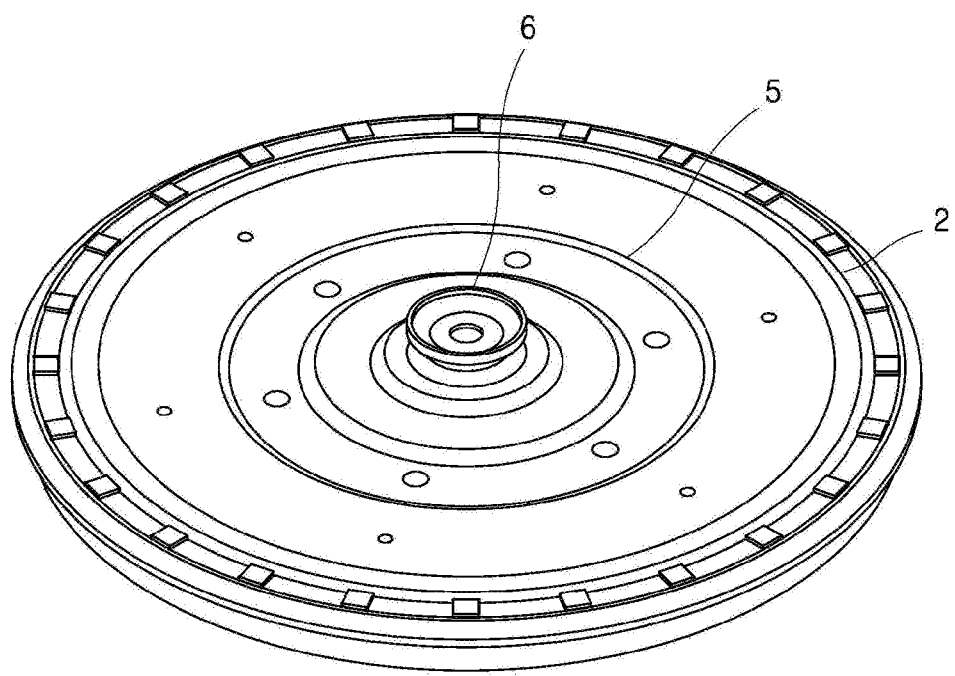

The above-mentioned objects, features, and advantages of the present disclosure are described in detail with reference to the accompanying drawings. Accordingly, the skilled person in the art to which the present disclosure pertains may easily implement the technical idea of the present disclosure. In the description of the present disclosure, if it is determined that a detailed description of a well-known relevant technology of the present disclosure may unnecessarily obscure the gist of the present disclosure, the detailed description thereof is omitted. One or more implementations of the present disclosure are described in detail with reference to the accompanying drawings. In the drawings, same reference numerals are used to refer to same or similar components.

The present disclosure relates to an electric pressure cooker that may prevent a steam exhaust flow path from being clogged, for example, by rice water generated during cooking.

One or more examples of an electric pressure cooker are described below in detail with reference to FIGS. 3 to 15.

Figure 3:
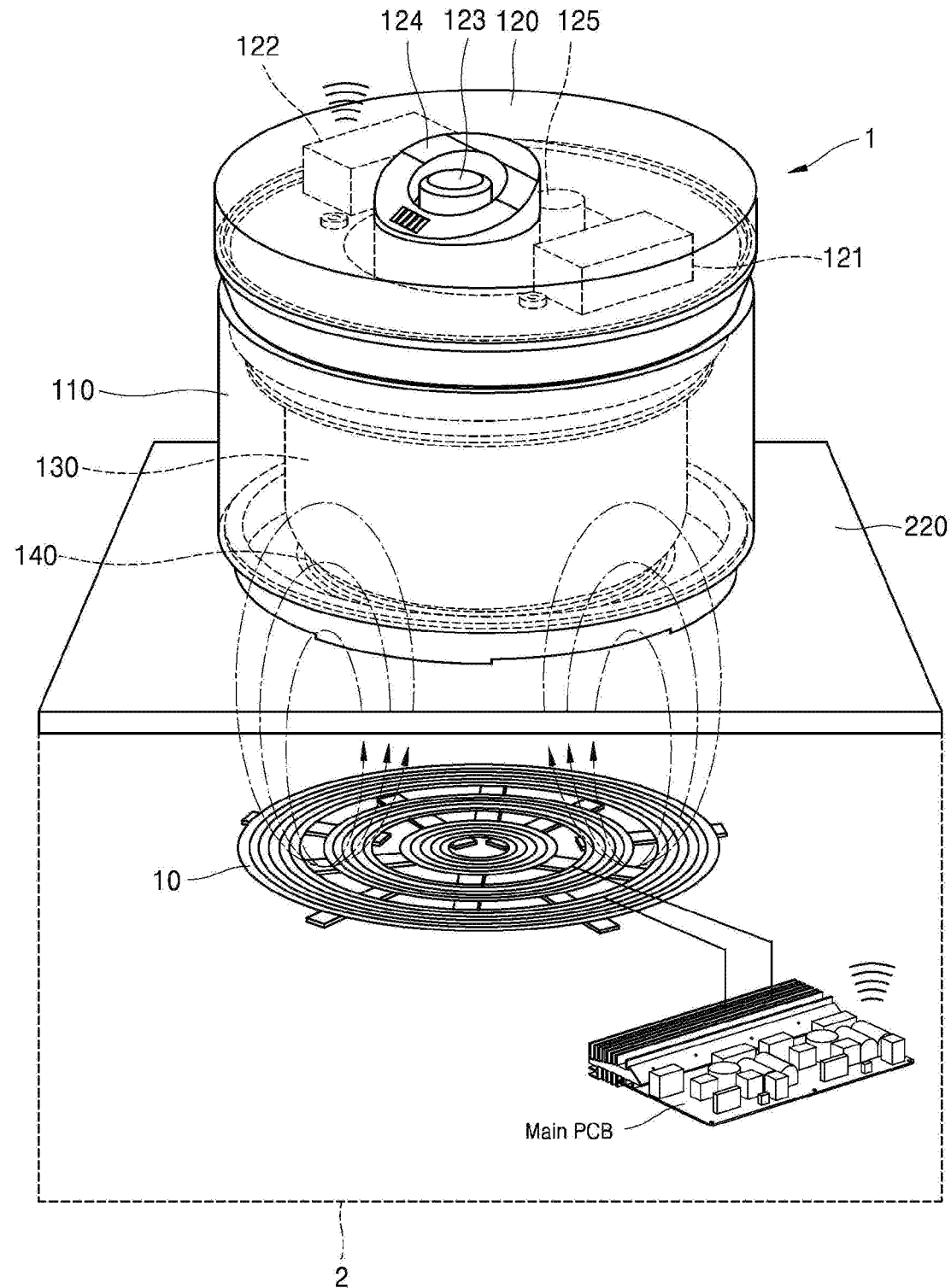
FIG. 3 shows an example of an electric pressure cooker that operates on an induction heating device.
Figure 4:
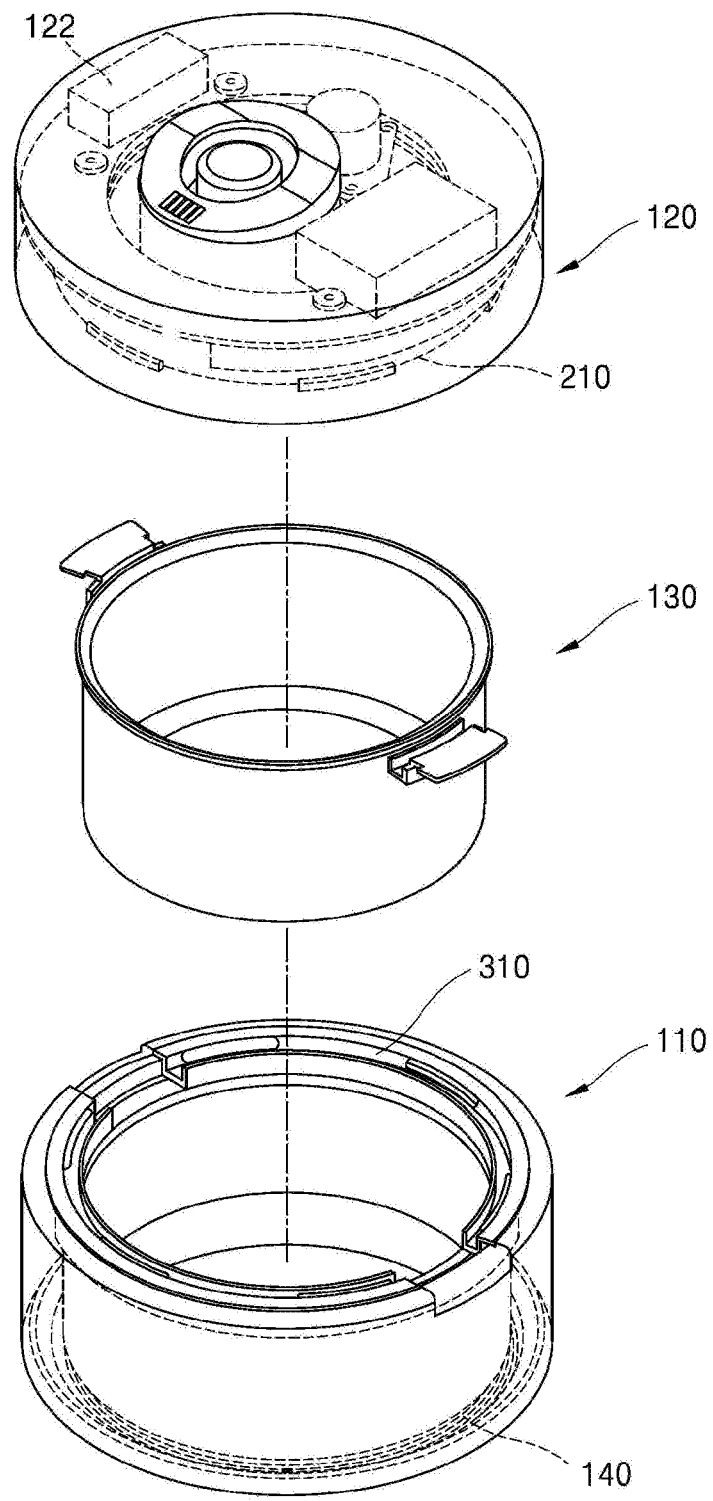
FIG. 4 is an exploded view showing examples of a lid, an inner pot, and a main body included in the electric pressure cooker in FIG. 3.

FIG. 3 shows an example electric pressure cooker that operates on an induction heating device. FIG. 4 is an exploded view showing examples of a lid, an inner pot, and a main body included in the electric pressure cooker in FIG. 3.

Figure 5:
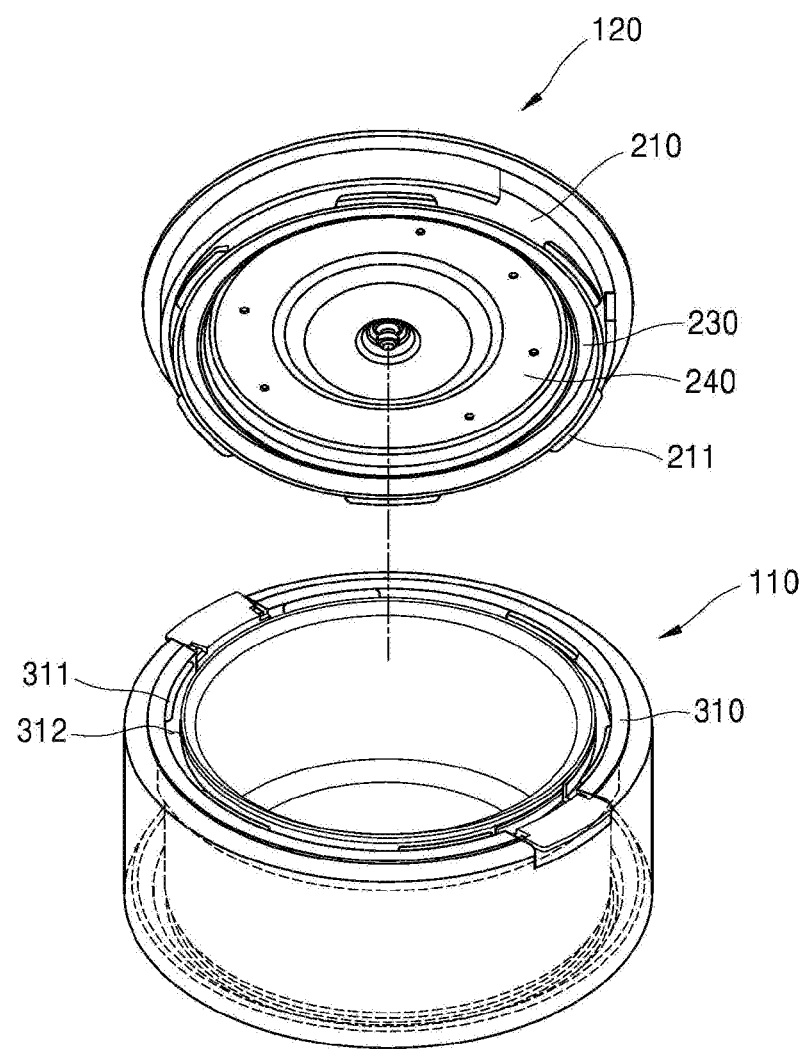
FIG. 5 shows examples of a lid and a main body that may be fastened to each other by rotation.
Figure 6:
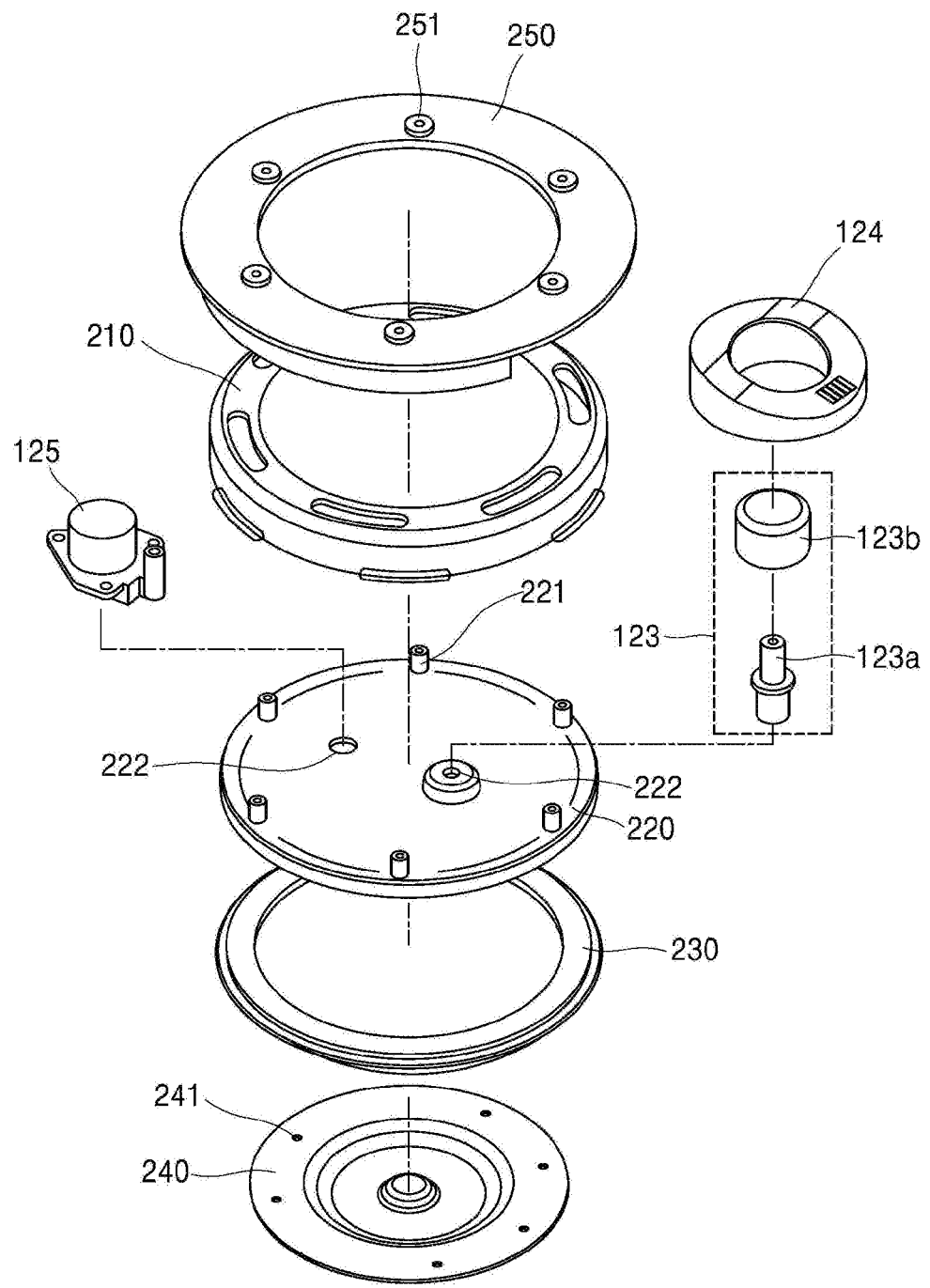
FIG. 6 is an exploded view showing example components of a lid.

FIG. 5 shows an example of rotational fastening of a lid and a main body. Further, FIG. 6 is an exploded view showing example components of a lid.

Figure 7:
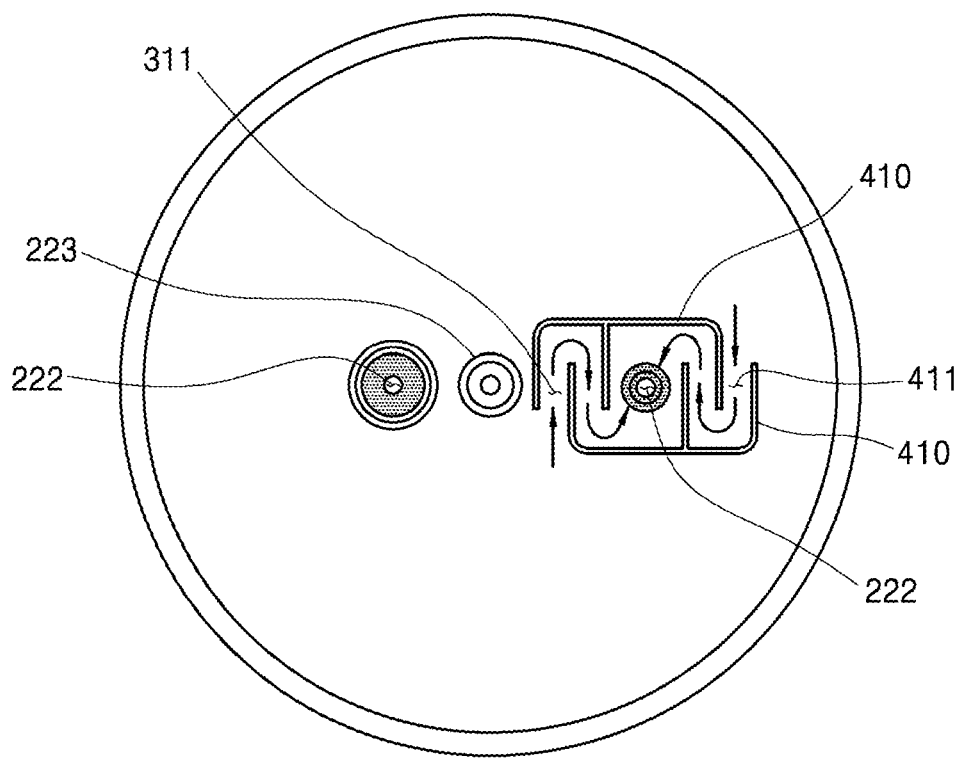
FIG. 7 shows a lower surface of an example inner lid.
Figure 8:
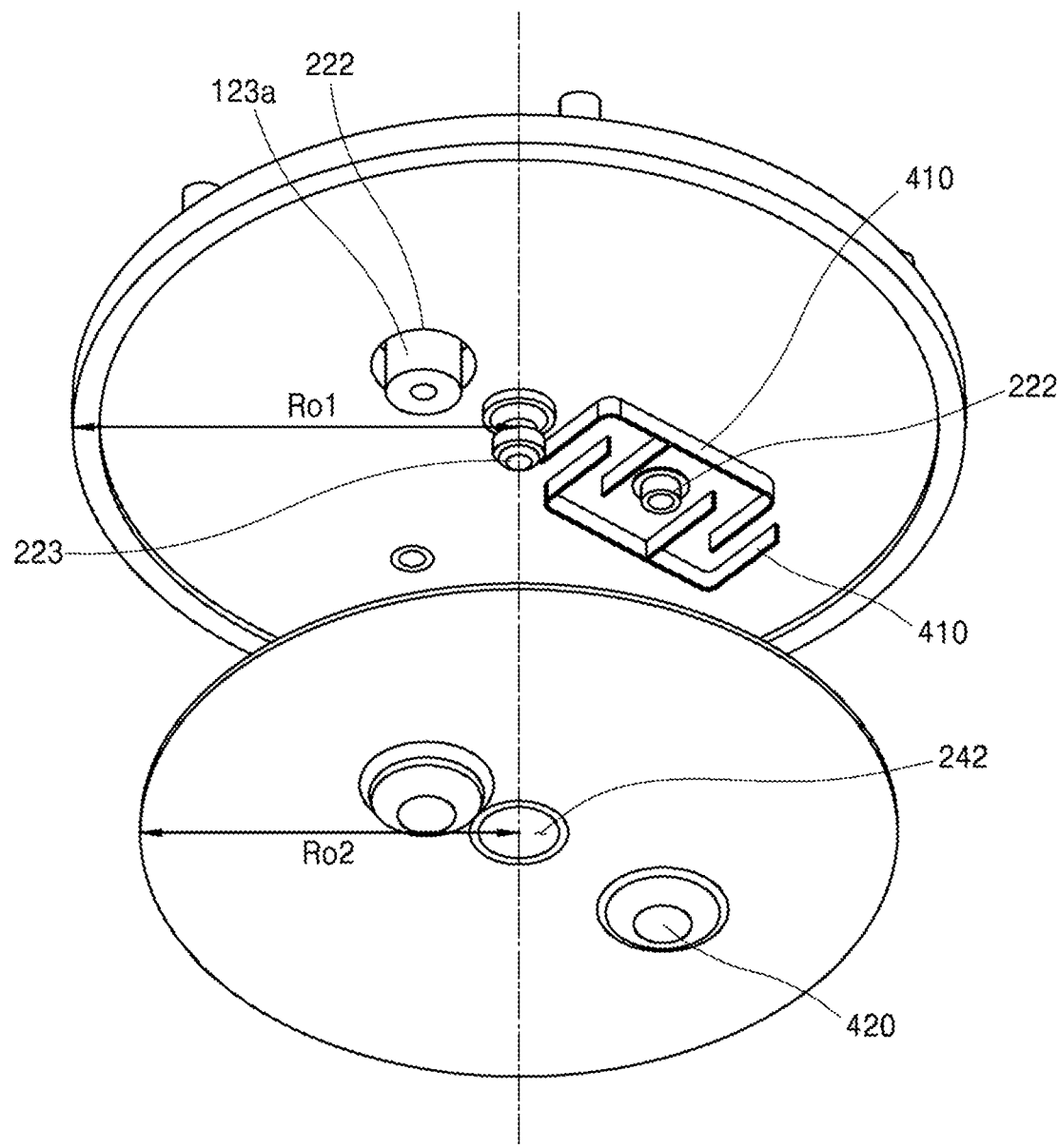
FIG. 8 shows the inner lid in FIG. 7 and an example of an inside lid coupled to the inner lid.
Figure 9:
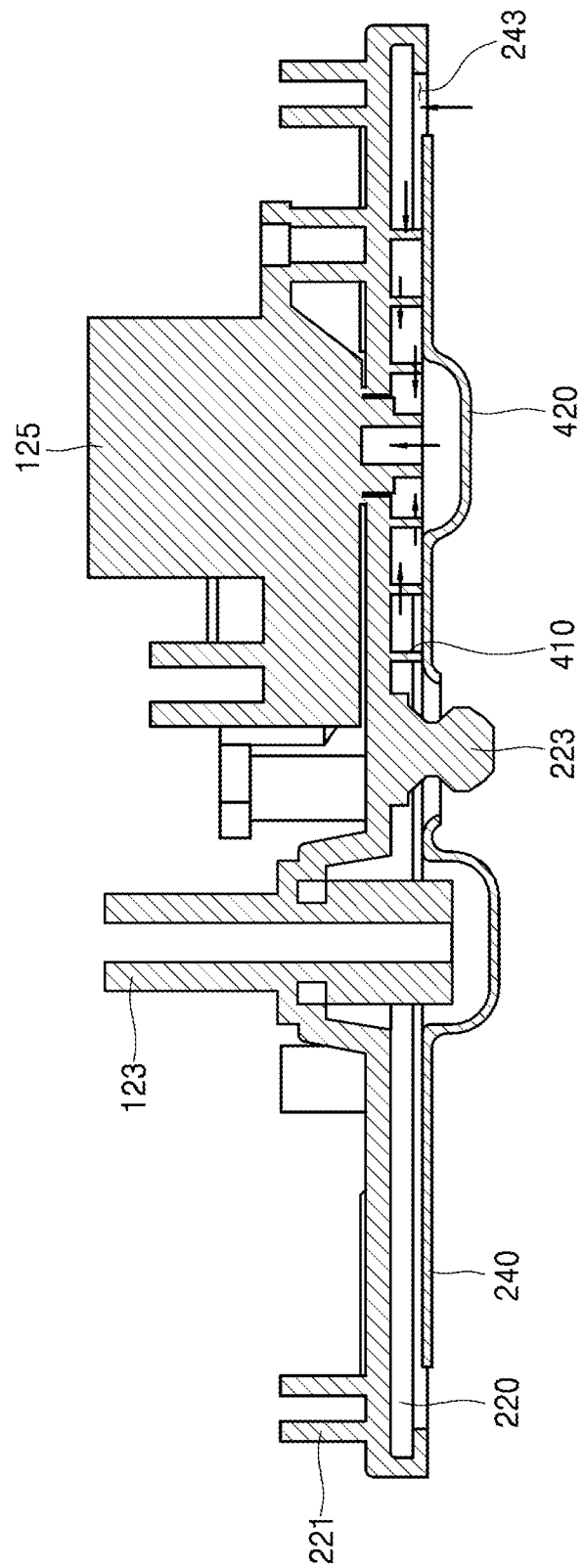
FIG. 9 shows an example of a steam flow path defined when the inner lid is coupled to the inside lid shown in FIG. 8.

FIG. 7 shows a lower surface of an example inner lid. FIG. 8 shows an inner lid in FIG. 7 and an example inside lid coupled to the inner lid. Further, FIG. 9 shows an example of a steam flow path defined when the inner lid and the inside lid are coupled to each other, as shown in FIG. 8.

Figure 10:
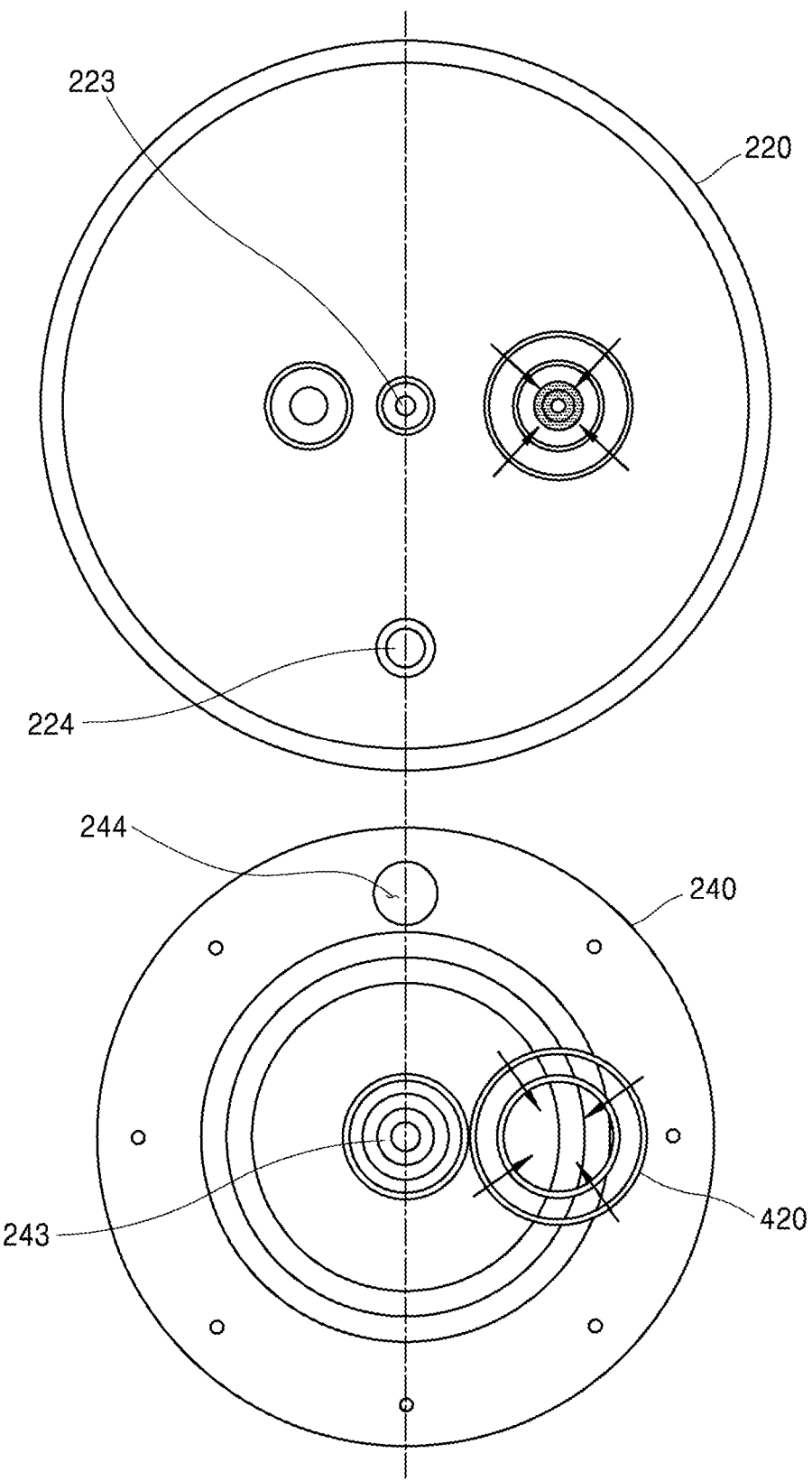
FIG. 10 shows a lower surface of an example inner lid and an upper surface of an example inside lid.
Figure 11:
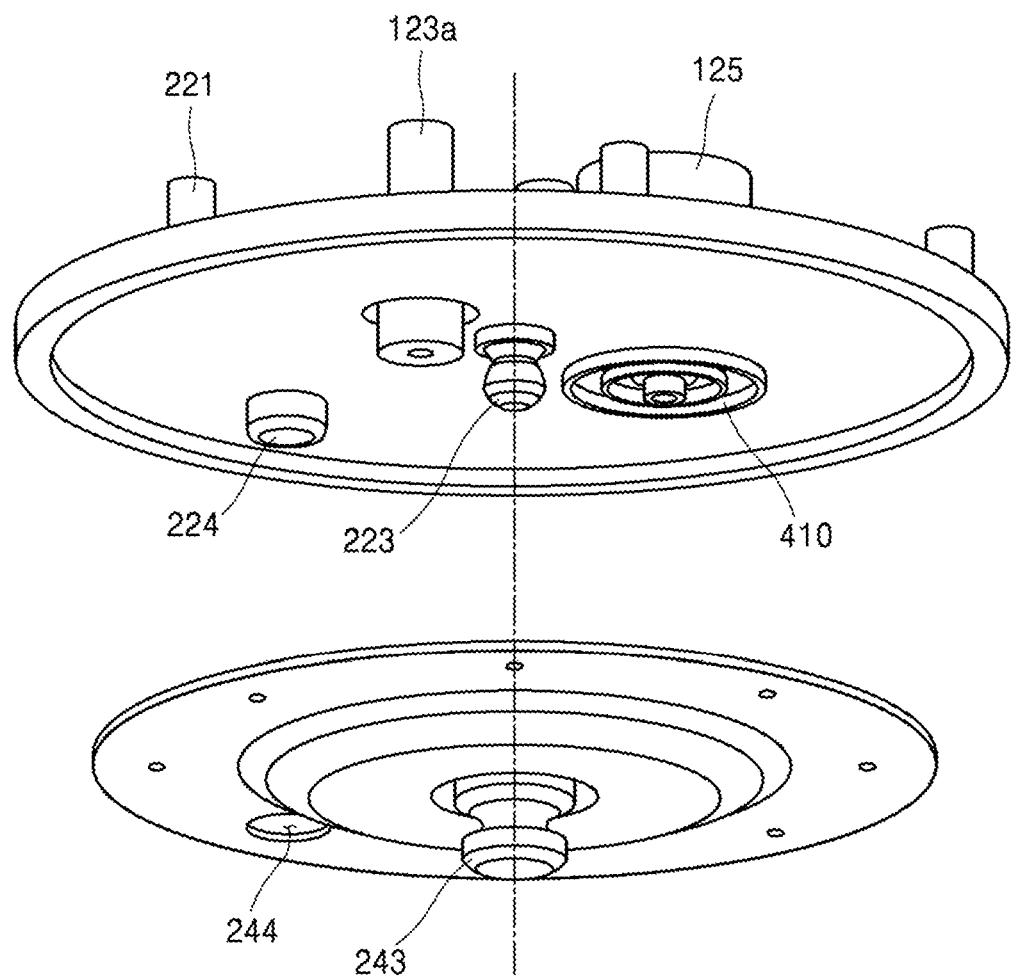
FIG. 11 shows the inner lid and the inside lid in FIG. 10 that may be coupled to each other by an example fastening boss and an example packing member.
Figure 12:
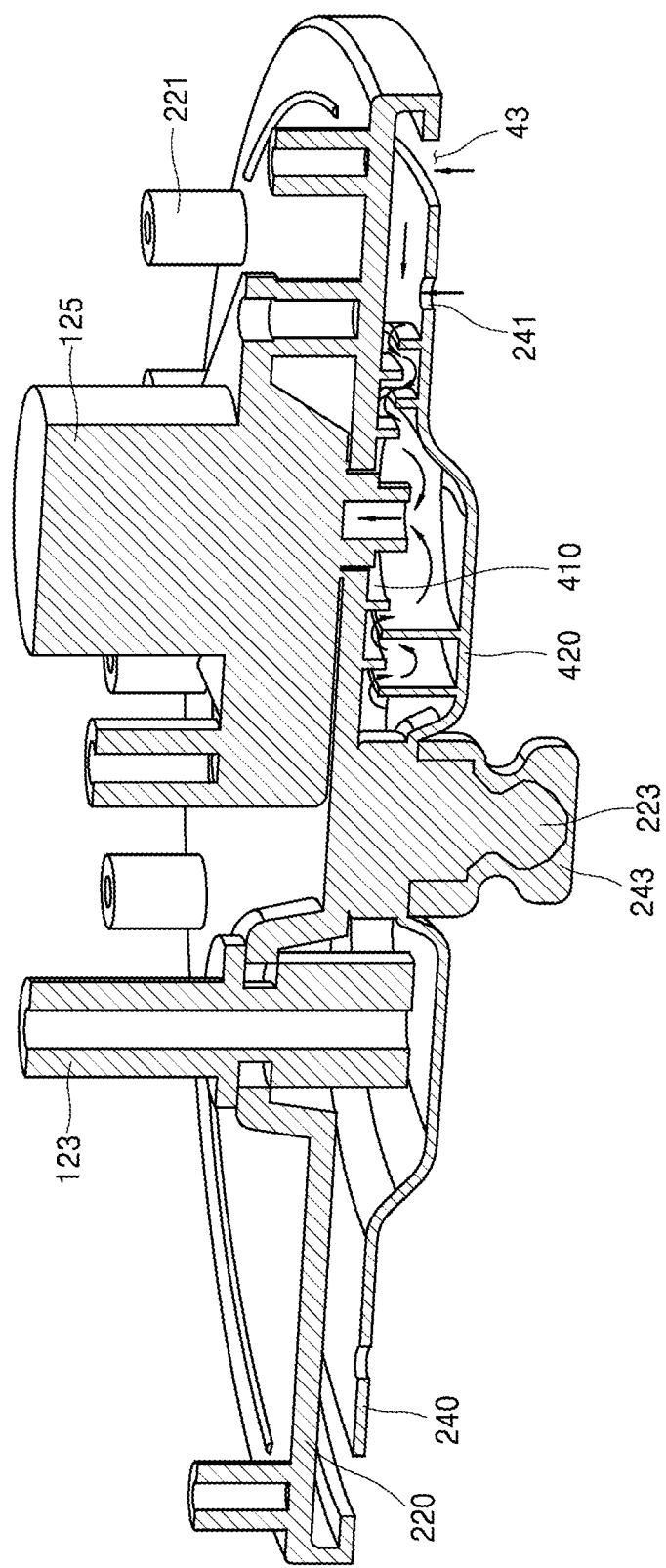
FIG. 12 shows an example of a steam flow path defined when the inner lid is coupled to the inside lid in FIG. 11.

FIG. 10 shows a lower surface of an example inner lid and an upper surface of an example inside lid. FIG. 11 shows the inner lid and the inside lid shown in FIG. 10 that may be coupled to each other by an example fastening boss and an example packing member. Further, FIG. 12 shows an example of a steam flow path defined when the inner lid is coupled to the inside lid as shown in FIG. 11.

Figure 13:
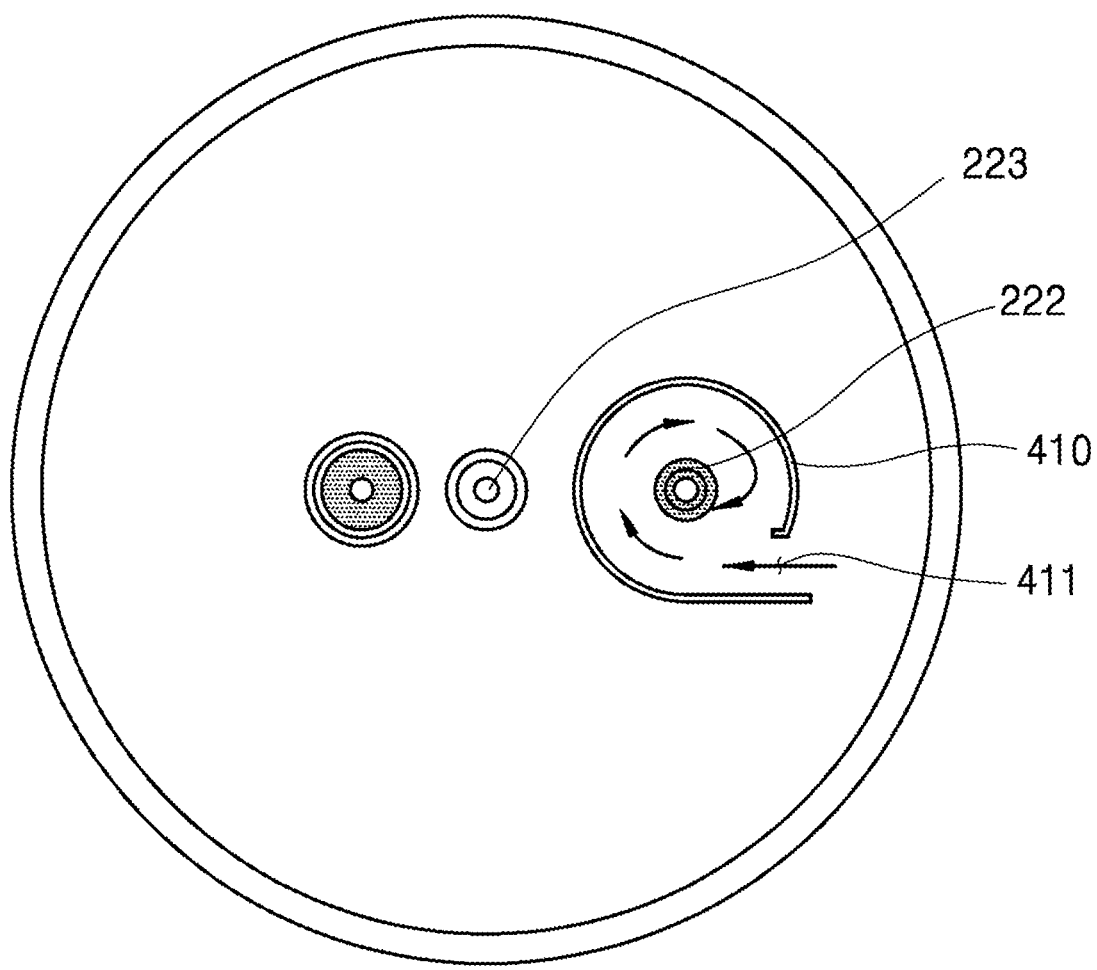
FIG. 13 shows a lower surface of an example inner lid.
Figure 14:
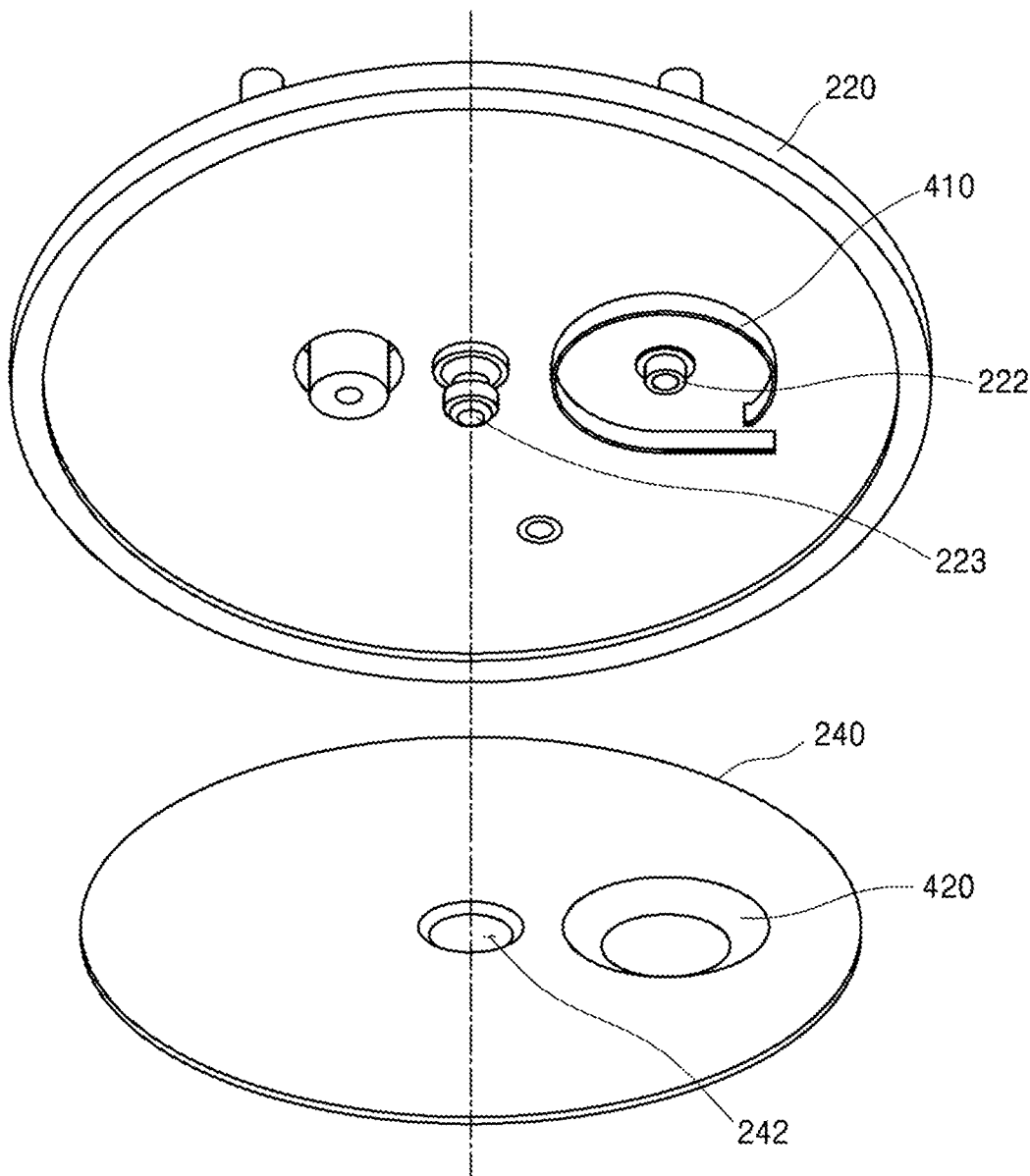
FIG. 14 shows the inner lid shown in FIG. 13 and an example inside lid coupled to the inner lid.
Figure 15:
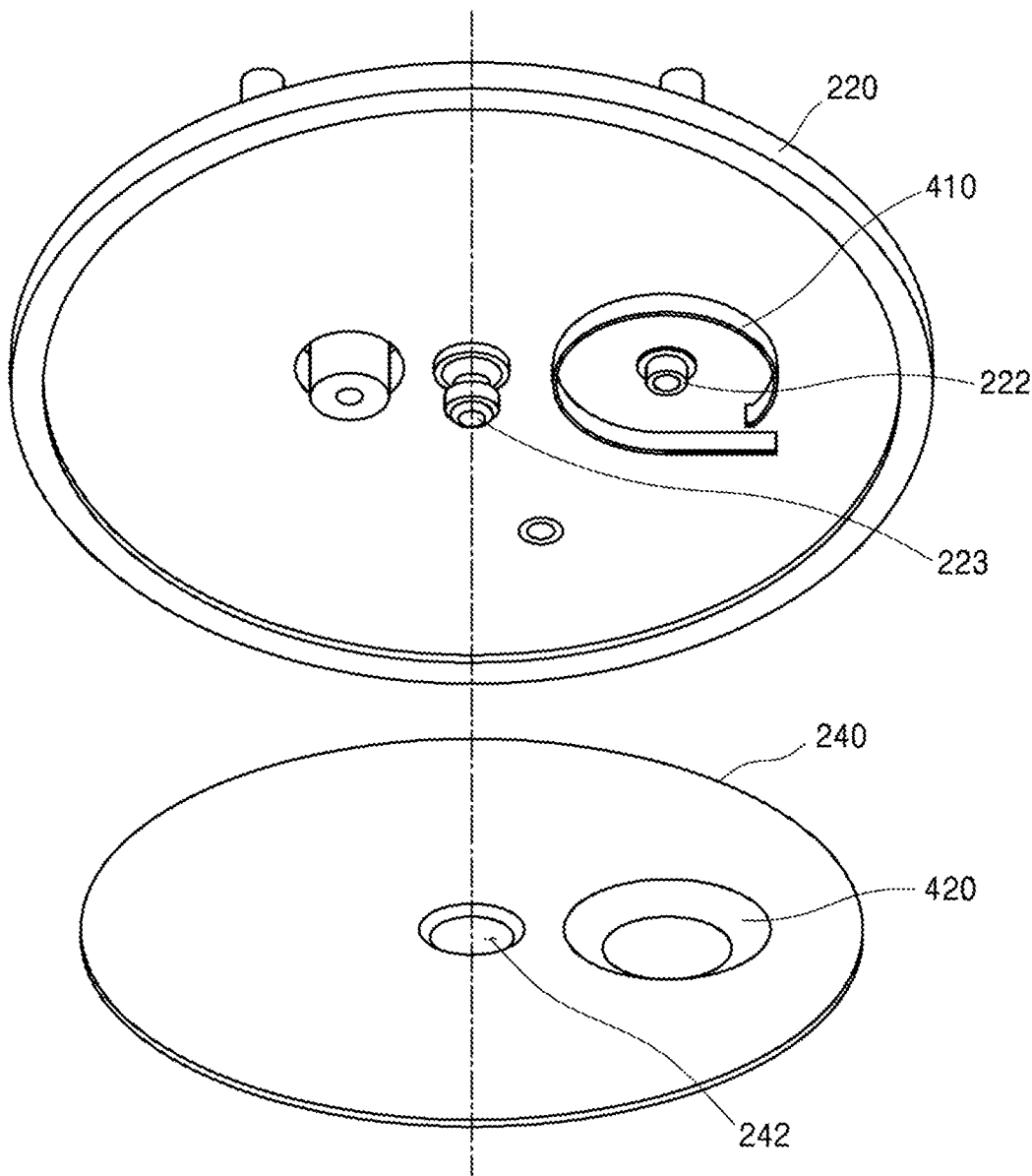
FIG. 15 shows an example of a steam flow path defined when the inner lid and the inside lid are coupled to each other in FIG. 14.

FIG. 13 shows a lower surface of an example inner lid. FIG. 14 shows the inner lid shown in FIG. 13 and an example inside lid coupled to the inner lid. Further, FIG. 15 shows an example of a steam flow path defined when the inner lid and the inside lid are coupled to each other shown in FIG. 14.

In some implementations, an electric pressure cooker 1 may use a direct heating method in which an inner pot 130 described below receives power at a lower portion of a bottom and a heater coil disposed on an outer surface of the inner pot 130 receives power and releases heat to directly heat the inner pot 130.

In some implementations, the electric pressure cooker 1 may use an induction heating method in which eddy current is generated on a surface of the inner pot 130 through an electromagnetic induction phenomenon, to heat the inner pot 130 using Joule's heat generated based on the eddy current.

Hereinafter, in a description of a configuration of the electric pressure cooker 1, it is assumed that the electric pressure cooker 1 uses the induction heating method.

Various components of the electric pressure cooker are described in detail with reference to FIGS. 3 and 4.

FIGS. 3 and 4 respectively show an example electric pressure cooker 1 including a main body 110, a lid 120, and an inner pot 130. A power receiving coil 140 may be provided on a bottom surface of the main body 110. The lid 120 may include a controller 121, a communicator 122, a pressure controller 123, and a noise reducer, and a steam exhauster 125.

Components of the electric pressure cooker 1 are not limited to examples shown in FIGS. 3 and 4, and some components can be added, changed or deleted as necessary.

In some implementations, an electric pressure cooker 1 may be operated on any induction heating device 2 that can heat an object through an electromagnetic induction phenomenon.

For example, as shown in FIG. 3, the electric pressure cooker 1 may be placed on an inner lid 220 of any induction heating device 2 including a heating coil 10 and may operate with being placed on a vertical line of the heating coil 10.

In some implementations, a main printed circuit board (PCB) of the induction heating device 2 may apply a current to the heating coil 10. Accordingly, a magnetic field may be generated by the heating coil 10, and the magnetic field generated by the heating coil 10 may induce a current in the inner pot 130 and the power receiving coil 140 described below.

The main body 110 may be configured to support a lower portion and a side portion of the electric pressure cooker 1, and an upper surface of the main body 110 is open to define a cooking space. In the cooking space, cooking operation may be performed on the food. More specifically, the inner pot 130 is accommodated in the cooking space of the main body 110, and various types of grains such as rice may be cooked inside of the inner pot 130.

For example, the main body 110 may define a body opening at an upper surface thereof, and the inner pot 130 may define a pot opening at an upper surface thereof. The inner pot 130 may be inserted into the main body 110 through the body opening and configured to receive food items through the pot opening.

The lid 120 may be configured to seal an upper portion of the electric pressure cooker 1, and may be fastened to the upper surface of the main body 110 to be opened and closed with respect to the upper surface of the opened main body 110.

For example, the lid 120 may be coupled to the main body 110 using a hinge to be selectively opened and closed. More specifically, the lid 120 may be coupled to a hinge shaft provided on the upper surface of the main body 110 and selectively opened and closed with respect to the upper surface of the main body 110 by rotating about a hinge shaft.

In another example, the lid 120 may be removed from the main body 110. More specifically, the lid 120 may be coupled to the upper surface of the main body 110 using any fastening member provided in plural at an upper edge of the main body 110. In this case, the lid 120 may be completely separated from the main body 110, and thus a cleaning property with respect to the lid 120 may be improved in the use of the electric pressure cooker 1.

It is described below on the assumption that the lid 120 is completely coupled to the main body 110 or is completely separated from the main body 110.

In some implementations, as shown in FIG. 3, the lid 120 may include a controller 121 that controls overall operation of the electric pressure cooker 1 and a communicator 122 that performs data communication with a main PCB of the induction heating device 2. Further, in some examples, the lid 120 may include a display that may visually output state information related to the electric pressure cooker 1 and a battery that supplies power to the above-mentioned controller 121, communicator 122, and display.

The controller 121, the communicator 122, and the display may be implemented with a printed circuit board (PCB) including a plurality of integrated circuits (ICs). In some examples, the controller 121 may include an electric circuit including the communicator 122 and the display.

In some implementations, the lid 120 may include a pressure controller 123 that maintains a constant internal pressure of the electric pressure cooker 1, and a noise reducer 124 including a sound absorbing member to reduce noise during exhaust of steam. Further, the lid 120 may include a steam exhauster 125 that exhausts the internal steam of the electric pressure cooker 1 to outside based on a specific control signal, for example, a control signal output by the controller 121 (e.g., a solenoid valve).

In some implementations, the lid 120 may include a lid fastening ring 210, the inner lid 220 and the inside lid 240. Components included in the lid 120 are described below.

The inner pot 130 may have an opened upper surface and may be accommodated in an internal cooking space of the main body 110. The food, such as grain, may be introduced into the inner pot 130 from the opened upper surface of the inner pot 130 and may be cooked in the inner pot 130. To this end, the heat may be generated on the surface of the inner pot 130.

For example, the inner pot 130 may be heated based on a magnetic field generated by the heating coil 10 of the induction heating device 2. As shown in FIG. 3, when the electric pressure cooker 1 is placed on the induction heating device 2, the lower surface of the inner pot 130 and the heating coil 10 may be opposed to each other and the bottom surface of the main body 110 may be provided between the lower surface of the inner pot 130 and the heating coil 10.

When current flows through the heating coil 10, the magnetic field generated by the heating coil 10 may induce a current in the inner pot 130, and Joule's heat may be generated in the inner pot 130 based on the induced current.

In order to generate the induced current, the inner pot 130 may be made of material having magnetic properties. For example, the inner pot 130 may be made of a cast iron containing iron (Fe), but may be made of a clad in which iron (Fe), aluminum (Al), stainless steel, and the like, are bonded.

The power receiving coil 140 may be provided inside of the main body 110 on the bottom surface of the main body 110, and a current may be induced in the power receiving coil 140 based a magnetic field generated by the heating coil 10. The power receiving coil 140 may have a ring shape having a predetermined inner diameter and outer diameter, and may be disposed at any position of the bottom surface of the main body 110. However, for example, in order to maximize heating efficiency of the inner pot 130 described above, the power receiving coil 140 may be disposed at an edge area of the bottom surface of the main body 110 and may be in parallel to the heating coil 10.

The current induced in the power receiving coil 140 may be supplied to an electronic device requiring power, such as a controller 121, a communicator 122, a display, and the like, provided in the lid 120.

Components included in the lid 120 are described in detail with reference to FIGS. 5 and 6. In FIGS. 5 and 6, an external case, a controller 121 and a communicator 122 are omitted from FIGS. 3 and 4.

Referring to FIGS. 5 and 6, the lid 120 may include a lid case 250, a lid fastening ring 210, an inner lid 220, an inner pot packing 230, and an inside lid 240. Components shown in FIGS. 5 and 6 are according to one example. The components of the lid 120 are not limited to the examples shown in FIGS. 5 and 6, and some components can be added, changed, or deleted as necessary.

The lid fastening ring 210 may be fastened to the opened upper surface of the main body 110. To this end, any fastening member fastened to the lid fastening ring 210 may be provided on the upper surface of the main body 110. More specifically, the lid fastening ring 210 may be fixed to the lid 120, and the main body fastening ring 310 having a shape corresponding to the lid fastening ring 210 may be fixed onto the upper surface of the main body 110. In some examples, the lid fastening ring 210 may be fastened to the main body fastening ring 310. Accordingly, the detachable operation of the above-mentioned lid 120 with respect to the main body 110 may be performed by fastening between the lid fastening ring 210 and the main body fastening ring 310.

Lid fastening ring 210 and the main body fastening ring 310 may be fastened to each other through any fastening method. For example, the lid fastening ring 210 and the main body fastening ring 310 may be fastened to each other by inserting one or a first fastening ring into the other or a second fastening ring, of the lid fastening ring 210 and the main body fastening ring 310, and may be fastened to each other by packing one or a first fastening ring into the other or a second fastening ring, of the lid fastening ring 210 and the main body fastening ring 310.

As shown in FIG. 5, the lid fastening ring 210 has a ring shape extending along the circumference of the lid 120, and the main body fastening ring 310 has a ring shape extending along the circumference of the upper surface of the main body 110 so that a shape of the main body fastening ring 310 corresponds to a shape of the lid fastening ring 210, so that the lid fastening ring 210 may be rotatably fastened to the main body fastening ring 310.

The rotational fastening may be any fastening through which the lid fastener is coupled to or released from the main body fastener by horizontally rotating the lid fastener with respect to the main body fastener. For example, the rotational fastening may be any fastening through which the two components are coupled to each other by horizontally engaging fastening members provided in the two components with each other.

More specifically, the lid fastening ring 210 is rotated after being inserted into the fastening groove 312 defined in the main body fastening ring 310 so that the lid fastening ring 210 is rotationally fastened to the main body fastening ring 310.

Referring back to FIG. 5, the lid fastening ring 210 may protrude downward, and the main body fastening ring 310 may include a fastening groove 312 depressed downward.

Accordingly, the lid fastening ring 210 may be inserted into the fastening groove 312 of the main body fastening ring 310.

The lid fastening ring 210 may be inserted into the fastening groove 312 of the main body fastening ring 310 and then horizontally rotated with respect to the main body fastening ring 310 to be rotatably fastened to the main body fastening ring 310. To this end, any fastening member may be included in the lid fastening ring 210 and the main body fastening ring 310 to couple the lid fastening ring 210 to the main body fastening ring 310 by being engaged with each other during rotation of the lid fastening ring 210.

For example, as shown in FIG. 5, the lid fastening ring 210 may include a plurality of engaging portions 211. The main body fastening ring 310 may include a plurality of guide protrusions 311. When the lid fastening ring 210 is rotated after being inserted into the fastening groove 312 of the main body fastening ring 310, the plurality of engaging portions 211 may be engaged with the plurality of guide protrusions 311, respectively.

More specifically, the plurality of engaging portions 211 may protrude in a first lateral direction (e.g., an outward direction thereof) and may be defined on the lid fastening ring 210. Further, the plurality of guide protrusions 311 may protrude in a second lateral direction (e.g., an inward direction thereof) that is opposite to the formation direction of the engaging portion 211 and may be formed in the main body fastening ring 310. Accordingly, the engaging portion 211 and the guide protrusion 311 may be engaged with each other in the circumferential direction when the lid fastening ring 210 rotates with respect to the main body fastening ring 310.

In other words, the lid fastening ring 210 may be inserted into the main body fastening ring 310 when the engaging portion 211 and the guide protrusion 311 are dislocated with respect to each other in the circumferential direction. When the lid fastening ring 210 is rotated when the lid fastening ring 210 is inserted into the main body fastening ring 310, the engaging portion 211 is moved in the circumferential direction with respect to the guide protrusion 311. When the lid fastening ring 210 rotates by a specific angle with respect to the main body fastening ring 310, the plurality of engaging portions 211 may be completely engaged with the plurality of guide protrusions 311.

When the engaging portion 211 is engaged with the guide protrusion 311, unless the lid fastening ring 210 rotates in the opposite direction, the lid 120 may not be separated from the main body 110 even when external power is applied to the lid 120 and the main body 110 in the vertical direction (e.g., in an upward direction or a downward direction).

Through the above-described structure, the lid 120 may be completely coupled to the main body 110 or may be completely separated from the main body 110, and thus, cleaning properties with respect to the lid 120 may be improved in use of the electric pressure cooker 1.

A process in which the lid 120 is rotated with respect to the main body 110 and is fastened to the main body 110 is described above with reference to structures of the lid fastening rings 210 shown in FIGS. 5 and 6. According to the present disclosure, the lid fastening ring 210 may be fastened to the main body 110 through various types of structures used in the art, in addition to structures shown in FIGS. 5 and 6.

Referring back to FIG. 6, the lid case 250 may be disposed above the lid fastening ring 210 mentioned above. The lid case 250 may be disposed above the lid fastening ring 210 and may have a shape corresponding to the shape of the lid fastening ring 210 for aesthetics of the lid 120. For example, when the lid fastening lid 210 has a ring shape, the lid case 250 may have a ring shape to cover the lid fastening ring 210 so that the lid fastening ring 210 may not be exposed to outside.

In some implementations, the inner lid 220 may be disposed inside of the lid fastening ring 210. More specifically, the inner lid 220 may be disposed along the inner surface of the lid fastening ring 210. As shown in FIG. 6, the inner lid 220 is basically disposed on the lower surface of the lid fastening ring 210, and when the outer surface of the lid fastening ring 210 has a predetermined vertical height, the inner lid 220 may be disposed along the inner surface of the lid fastening ring 210.

The lid case 250 and the inner lid 220 may be directly coupled to each other by the first fastening member 251 and the second fastening member 221. In this case, the lid fastening ring 210 is disposed between the lid case 250 and the inner lid 220 when the lid case 250 and the inner lid 220 are coupled to each other. More specifically, the first fastening member 251 may be provided in the lid case 250 and the second fastening member 221 may be provided in the inner lid 220. The first fastening member 251 may be fastened to the second fastening member 221, and in this case, the lid fastening ring 210 may be disposed between the lid case 250 and the inner lid 220 so that the lid case 250, the lid fastening ring 210, and the inner lid 220 may be integrated with each other.

The inner lid 220 may have a flat form and may include at least one steam outlet 222 and a first flow path guide member 410 formed on the lower surface of the inner lid 220, thereby blocking the upper surface of the inner pot 130. In some examples, the inner lid 220 may include a plurality of steam outlets 222, and the steam flow path may pass through at least one of the plurality of steam outlets 222.

The steam outlet 222 defines a hole to exhaust steam to outside, and may be connected to a plurality of components that exhaust the steam.

For example, a steam exhauster 125 may be provided on the upper surface of the inner lid 220. As shown in FIG. 6, the steam exhauster 125 may be provided on the upper surface of the inner lid 220 and may be provided on the same vertical line as the steam outlet 222. The steam exhauster 25 may exhaust the steam introduced through the steam outlet 222 to outside according to a user command.

For example, when the steam exhauster 125 is a solenoid valve, an inlet of the solenoid valve may be connected to the steam outlet 222, an outlet of the solenoid valve may communicate to outside of the electric pressure cooker 1. The solenoid valve may exhaust the steam introduced into the inlet through the outlet based on the control signal.

In some implementations, the controller 121 may generate a control signal according to the user command to control the solenoid valve. More specifically, when a user command regarding steam exhaust is input through an interface provided in the electric pressure cooker 1, the controller 121 may generate a control signal and provide the control signal to the solenoid valve, and the solenoid valve may exhaust, to outside, the inner steam of the electric pressure cooker 1 introduced into the steam outlet 222 based on the control signal.

In another example, a pressure controller 123 may be provided on the upper surface of the inner lid 220. As shown in FIG. 6, the pressure controller 123 may be provided on the same vertical line as the steam outlet 222 on the upper surface of the inner lid 220. The pressure controller 123 may exhaust the steam to outside based on the pressure of the steam introduced through the steam outlet 222 being exceeding a preset pressure.

The pressure controller 123 may operate mechanically. More specifically, the pressure controller 123 may block the steam from being exhausted through the steam outlet 222 by applying a predetermined pressure (a preset pressure) to the steam outlet 222. Accordingly, based on the pressure of the steam exceeding a preset pressure, the blocking with respect to the steam outlet 222 may be released so that the steam may be exhausted to outside.

For example, as shown in FIG. 6, the pressure controller 123 may include a pressure pipe 123a inserted or packed into the steam outlet 222 and a pressure weight that blocks the steam from being exhausted to the outlet of the pressure pipe 123a by applying a predetermined pressure (a preset pressure) to the outlet of the pressure pipe 123a.

The pressure weight 123b may seal the outlet of the pressure pipe 123a by applying a predetermined pressure (a preset pressure) to the outlet of the pressure pipe 123a so that steam may not be exhausted to outside through the pressure pipe 123a. In some examples, based on the pressure of the steam flowing through the inlet of the pressure pipe 123a exceeding the preset pressure, the pressure weight 123b rises to open the outlet of the pressure pipe 123a, and the steam may be exhausted to outside through the opened outlet.

The inner pot packing 230 may be assembled along the circumference of the inner lid 220 to seal a space between the inner lid 220 and the inner pot 130.

As described above, the inner lid 220 may block the upper surface of the inner pot 130. However, even in this case, a gap may be defined between the inner lid 220 and the inner pot 130 to flow the steam. In order to maintain the pressure of the steam generated in the inner pot 130, the inner pot packing 230 is assembled along the circumference of the inner lid 220 to seal the space between the inner lid 220 and the inner pot 130. Accordingly, the steam generated in the inner pot 130 may not be exhausted to any portion without passing through the above-mentioned steam outlet 222.

The inside lid 240 may be coupled to the lower surface of the inner lid 220 through any fastening means. More specifically, the inner lid 220 and the inside lid 240 may include fastening means, respectively, and a fastening means of the inner lid 220 may be fastened to a fastening means of the inside lid 240 so that the inside lid 240 is coupled to the lower surface of the inner lid 220.

Referring to FIGS. 7 and 8, in one example, a fastening boss 223 may be provided on the lower surface of the inner lid 220, and a fastening hole 242 may be provided in the inside lid 240. The inside lid 240 may be coupled to the lower surface of the inner lid 220 by inserting the fastening boss 223 into the fastening hole 242.

More specifically, a fastening boss 223 protruding downward by a predetermined length may be provided on the lower surface of the inner lid 220, and a fastening hole 242 into which the fastening boss 223 is inserted may be provided in the inside lid 240. The fastening boss 223 may protrude from a center of the inner lid 220 to minimize the fastening means, and the fastening hole 242 may be provided at a center of the inside lid 240.

Referring to FIGS. 10 and 11, in another example, a fastening boss 223a may be provided on a lower surface of the inner lid 220, and a packing member 243 may be provided on the inside lid 240. The inside lid 240 may be coupled to the lower surface of the inner lid 220 by packing of the fastening boss 223 with respect to the packing member 243. The fastening boss 223 shown in FIGS. 10 and 11 may be the same as the fastening boss 223 shown in FIGS. 7 and 8.

The packing member 243 may include any elastic body (e.g., rubber). When the fastening boss 223 is forcibly inserted into the packing member 243, the fastening boss 223 may be completely packed in the packing member 243 while the packing member 243 is deformed. When the fastening boss 223 is packed, the packing member 243 may apply an elastic force (a restoring force) toward the center of the fastening boss 223 based on its elasticity, and thus the fastening boss 223 may be fixed to the packing member 243.

The lid case 250, the lid fastening ring 210, the inner lid 220, the inner pot packing 230, and the inside lid 240 shown in FIG. 6 may be integrally coupled to one another through the above-mentioned fastening.

However, even when the inside lid 240 is fastened to the inner lid 220 through the above-described fastening, the inside lid 240 and the inner lid 220 may be spaced from each other by a predetermined interval. Accordingly, a steam flow path described below may be defined between the inside lid 240 and the inner lid 220.

In some implementations, as shown in FIG. 8, an additional hole greater than the above-described fastening hole 242 and the packing member 243 may not be defined in the inside lid 240. In some implementations, in order to increase an amount of steam introduced between the inside lid 240 and the inner lid 220, a plurality of steam inlets 241 may be further defined in the inside lid 240 as shown in FIG. 10. The movement of the steam introduced into the steam inlet 241 is described below with reference to FIG. 12.

The inside lid 240 may include a second flow path guide member 420 on the upper surface of the inside lid 240 and the second flow path guide member 420 has a shape corresponding to the shape of the first flow path guide member 410 provided on the inner lid 220. As described above, when the inside lid 240 is coupled to the inner lid 220, the inside lid 240 may guide the steam generated in the inner pot 130 to the steam outlet 222 through the steam flow path defined by the first flow path guide member 410 and the second flow path guide member 420.

In some implantations, the first flow path guide member 410 and the second flow path guide member 420 may have shapes corresponding to each other and may be provided in the inner lid 220 and the inside lid 240, respectively, to define the steam flow path. Accordingly, the steam generated in the inner pot 130 may move through the steam flow path defined between the inner lid 220 and the inside lid 240 to be introduced into the steam outlet 222 provided in the inner lid 220.

In some examples, the first flow path guide member 410 and the second flow path guide member 420 may be configured to, based on the inner lid 220 and the inside lid 240 being coupled to each other, be horizontally or vertically spaced apart from each other to thereby define the steam flow path therebetween.

In some implementations, the first flow path guide member 410 and the second flow path guide member 420 may define a steam flow path to increase a length of the moving path of the steam so as to separate the rice water or alien substances included in the steam. In other words, the first flow path guide member 410 and the second flow path guide member 420 may define the steam flow path so that the steam circulates or swirls between the inner lid 220 and the inside lid 240 for a predetermined period of time or more.

Accordingly, the dense rice water or alien substance in the steam passing through the steam flow path may sink on the steam flow path.

One or more examples of a steam flow path defined by the first flow path guide member 410 and the second flow path guide member 420 and a process of moving steam through the steam flow path are described below.

In some implementations, the first flow path guide member 410 may include a flow path guide wall that horizontally is bent and protrudes to contact the upper surface of the inside lid 240 to define a horizontal zigzag steam flow path.

Referring to FIGS. 7 and 8, the first flow path guide member 410 protruding from the lower surface of the inner lid 220 may include at least one flow path guide wall horizontally bent.

In some examples, the flow guide wall may contact the upper surface of the inside lid 240. In other words, the height of the flow path guide wall may be equal to the distance between the inner lid 220 and the inside lid 240. Accordingly, the flow path guide wall may define a steam flow path vertically sealed between the inner lid 220 and the inside lid 240.

The steam may be introduced through the inlet 411 of the flow path guide wall, and may be circulated in a zigzag form along a wall surface of the flow path guide wall horizontally bent and may be exhausted to the steam outlet 222.

In some implementations, the second flow path guide member 420 may define a circular depression. More specifically, as shown in FIG. 8, the second flow path guide member 420 may define a circular depression depressed downward with respect to the inside lid 240.

The circular depression may be included in an area formed by the first flow path guide member 410. In other words, viewed from the top of the electric pressure cooker 1, a circular depression may be included in the area formed by the first flow path guide member 410.

The rice water or the alien substances contained in the steam may temporarily remain on the wall surface of the flow path guide wall due to a difference in density between the steam and the rice water or the alien substance, and may flow down, and the flowed rice water or alien substances may be stored in the circular depression.

With the above-described structure, as no rice water or alien substance continually remains on the wall surface of the flow path guide wall, even when the amount of steam passing through the horizontal zigzag steam flow path is large, clogging of the flow path guide wall may be prevented.

The movement path of the steam is described in detail with reference to FIG. 9. When the inner lid 220 is coupled to the inside lid 240, the steam may be introduced through a gap 43 between the inner lid 220 and the inside lid 240. The gap 43 may be defined due to differences in radiuses between the inner lid 220 and the inside lid 240.

More specifically, as shown in FIG. 8, a radius Ro2 of the inside lid 240 may be less than a radius Ro1 of the inner lid 220. Accordingly, when the inner lid 220 and the inside lid 240 are coupled to each other, the gap 43 may be defined in a ring area greater than the radius Ro2 of the inside lid 240 and less than the radius Ro1 of the inner lid 220.

In the steam exhausting operation of the steam exhauster 125, the steam introduced through the gap 43 between the inner lid 220 and the inside lid 240 moves in a zigzag form along the flow path guide wall to be exhausted to outside through the steam outlet 222.

In some examples, the rice water or the alien substance in the steam filtered by the flow guide wall may be lowered down by gravity and may be stored in the circular depression.

In some implementations, the first flow path guide member 410 may protrude downward from the lower surface of the inner lid 220, and the second flow path guide member 420 may protrude upward from the upper surface of the inside lid 240.

More specifically, the first flow path guide member 410 may include a first flow path guide wall protruding downward, and the second flow path guide member 420 may include a second flow path guide wall protruding upward.

For example, the shape of the first flow guide wall and the shape of the second flow guide wall may be the same. For example, when the first flow path guide wall has the shape shown in FIGS. 7 and 8, the second flow path guide wall may also have the same shape as the first flow path guide wall.

In this case, the lower surface of the first flow path guide wall and the upper surface of the second flow path guide wall may contact each other. In this case, a sum of the height of the first flow path guide wall and the height of the second flow path guide wall may be the same as the distance between the inner lid 220 and the inside lid 240 to define the steam flow path vertically sealed between the inner lid 220 and the inside lid 240.

In another example, the shape of the first flow path guide wall may be different from the shape of the second flow path guide wall. For example, when the first flow path guide wall has a wall shape shown in FIGS. 7 and 8, the second flow path guide member 420 may include a second flow path guide wall that is horizontally curved and protrudes to contact the lower surface of the inner lid 220 and define a horizontal zigzag steam flow path.

In this case, when the inner lid 220 and the inside lid 240 are coupled, the first flow path guide wall and the second flow path guide wall may not be structurally overlapped with each other on the same horizontal plane. Accordingly, the portion where the steam flow path is bent may be greater than that shown in FIG. 7, and a larger amount of rice water or alien substance may be filtered out of the flow path guide wall.

In some implementations, the first flow path guide member 410 may include a first circular flow path guide wall protruding downward. Further, the second flow path guide member 420 may include a second circular flow path guide wall having the same center as the first flow path guide wall and having a different radius from the first flow path guide wall and protruding upward. In this case, the first flow path guide wall and the second flow path guide wall may define the vertical zigzag steam flow path.

Referring to FIGS. 10 and 11, the first flow path guide member 410 protruding from the lower surface of the inner lid 220 may include at least one first flow path guide wall having a circular shape. When the first flow path guide wall are provided in plural, centers of the first flow path guide walls having the circular shapes are the same. In other words, the plurality of first flow path guide walls may have shapes of concentric circles.

Similarly, the second flow path guide member 420 protruding from the upper surface of the inside lid 240 may include at least one second flow path guide wall having a circular shape. When the second flow path guide walls are provided in plural, the centers of the second circular flow path guide walls may be the same. In other words, the plurality of second flow path guide walls may have shapes of concentric circles.

In this case, the center of the second flow path guide wall may be the same as the center of the first flow path guide wall, and the radius of the second flow path guide wall may be different from the radius of the first flow path guide wall. Accordingly, when the inner lid 220 and the inside lid 240 are coupled to each other, the first flow path guide wall and the second flow path guide wall may have shapes of concentric circles provided on the same horizontal plane and having the same center and different radiuses from each other.

In some implementations, each of heights of the first flow path guide wall and the second flow path guide wall may be less than a gap between the inner lid 220 and the inside lid 240. Accordingly, the first flow path guide wall and the second flow path guide wall may define a vertical zigzag steam flow path.

The movement path of the steam is described in detail with reference to FIG. 12. When the inner lid 220 and the inside lid 240 are coupled to each other, the steam may be introduced through a steam inlet 241 defined in the inside lid 240 and a gap 43 between the inner lid 220 and the inside lid 240.

In the steam exhaust operation of the steam exhauster 125, the steam introduced between the inner lid 220 and the inside lid 240 may move vertically in a zigzag shape along the first flow path guide wall and second flow path guide wall, and may be exhausted to outside through the steam outlet 222.

In some implementations, some of the portion of the inside lid 240 in which the second flow path guide wall is defined may be depressed downward. The depressed portion of the inside lid 240 may be included in an area formed by the first flow path guide wall and second flow path guide wall. In other words, a portion in which the inside lid 240 is depressed may be included in an area formed by the first flow path guide wall and the second flow path guide wall when the electric pressure cooker 1 is viewed from the top.

The rice water or the alien substances contained in the steam may temporarily remain on the wall surface of the first flow path guide wall and the second flow path guide wall due to the difference in density between the steam and the rice water or the alien substance, and may flow down, and the flowed rice water or alien substances may be stored in the portion where the inside lid 240 is depressed.

With the above-described structure, as no rice water or alien substance continually remains on the wall surfaces of the first flow path guide wall and the second flow path guide wall, even when a large amount of steam passing through the vertical zigzag steam flow path is large, the first flow path guide wall and the second flow path guide wall may be prevented from being clogged.

In some implementations, the centers of the first flow path guide wall and the second flow path guide wall may be positioned on the same vertical line as the steam outlet 222. In other words, the first flow path guide wall disposed in the inner lid 220 may include the steam outlet 222 at a center of the inner lid 220 and may have a circular shape and may be disposed on the lower surface of the inner lid 220.

As the centers of the first flow path guide wall and the second flow path guide wall are disposed on the same vertical line as the steam outlet 222, a lowest pressure may be provided at the center of the first flow path guide wall and the second flow path guide wall when the steam is exhausted, and the steam generated in the inner pot 130 may be introduced into the centers of the first flow path guide wall and the second flow path guide wall. Accordingly, the speed of exhausting the steam may be increased and an amount of filtered rice water or alien substances may be increased.

In some implementations, the first flow path guide member 410 may include a spiral flow path guide wall defining an inlet 411 at one side of the spiral flow path guide wall and protruding to contact the upper surface of the inside lid 240. Further, the second flow path guide member 420 may include a circular depression having the same center as the flow path guide wall and a less radius. In some examples, the flow path guide wall and the depression may define the spiral steam flow path.

Referring to FIGS. 13 and 14, the flow path guide wall disposed on the inner lid 220 may have a spiral shape in which an inlet 411 is defined at one side of the flow path guide wall. For example, the flow path guide wall may have a circular shape in which a portion of an outer circumferential surface of the flow path guide wall is opened to define the inlet 411.

In some implementations, the flow path guide wall may contact the upper surface of the inner lid 220. In other words, the height of the flow path guide wall may be equal to the distance between the inner lid 220 and the inside lid 240. Accordingly, the flow path guide wall may define the steam flow path vertically sealed between the inner lid 220 and the inside lid 240.

The steam may be introduced through the inlet 411 of the flow path guide wall and may be circulated spirally along the inner circumferential surface of the flow path guide wall, and may be exhausted to the steam outlet 222.

A circular depression defined in the inside lid 240 may have a circular shape depressed with respect to the inside lid 240. The depression may be included in the area formed by the flow path guide wall. In other words, viewed from the top of the electric pressure cooker 1, the depression may be included in the area formed by the flow path guide wall.

For example, when the flow path guide wall has a circular shape in which a portion of the outer circumferential surface of the flow path guide wall is open, the depression may have a circle shape radius of which is less than the radius of the flow path guide wall. Accordingly, as the inside lid 240 is not depressed at the portion where the inlet 411 of the flow path guide wall is defined, the inlet 411 may be narrowly defined.

When the inlet 411 is narrowly defined, as a speed of the steam flowing through the inlet 411 increases, the amount of filtered rice water or alien substance may be increased.

The rice water or the alien substances filtered due to density differences between the steam and the rice water or the alien substance, on an inner circumferential surface of the flow path guide wall may flow down and the flowed rice water or alien substance may be stored in the depression.

Through the above-described structure, as no rice water or alien substance continually remains on the wall surface of the flow path guide wall, even if the amount of steam passing through the spiral steam flow path is greater, clogging of the flow path guide wall may be prevented.

The movement path of the steam is described in detail with reference to FIG. 15. When the inner lid 220 and the inside lid 240 are coupled to each other, the steam may be introduced through the gap 43 between the inner lid 220 and the inside lid 240.

In the steam exhausting operation of the steam exhauster 125, the steam introduced between the inner lid 220 and the inside lid 240 may move spirally along the inner circumferential surface of the flow path guide wall and may be exhausted to outside through the steam outlet 222.

In some implementations, the center of the flow path guide wall may be positioned on the same vertical line as the steam outlet 222. For example, the flow path guide wall disposed on the inner lid 220 may have a spiral shape and include a steam outlet 222 at a center of the flow path guide wall and may be disposed on the lower surface of the inner lid 220.

As the center of the flow path guide wall is located on the same vertical line as the steam outlet 222, the lowest pressure may be provided at the center of the flow path guide wall when the steam is exhausted and the steam generated in the inner pot 130 may be introduced into the center of the flow path guide wall, thereby increasing the speed of exhausted steam and increasing the amount of filtered rice water or alien substance.

In some implementations, the steam exhaust flow path may be prevented from being clogged by the rice water generated during cooking, thereby preventing safety risks such as explosion of the electric pressure cooker 1 due to the clogging of the steam exhaust flow path and the fire generated due to the explosion.

In some implementations, the steam flow path may be defined to circle the steam between the inside lid 240 and the inner lid 220, thereby filtering the rice water or the alien substance in the steam on the steam flow path and washing by separating the inside lid 240 to easily process the rice water or the alien substances deposited on the steam flow path.

In some implementations, the first flow path guide member 410 and the second flow path guide member 420 may be opposed to each other and may be disposed at positions corresponding to each other to define the steam flow path.

The coupling guide boss 224 may protrude from the lower surface of the inner lid 220 to oppose the first flow path guide member 410 and the second flow path guide member 420 to each other, and the coupling guide hole 244 may be defined in the inside lid 240.

Referring to FIGS. 10 and 11, a coupling guide boss 224 protruding downward may be defined on a lower surface of the inner lid 220, and a coupling guide boss 224 into which the coupling guide boss 224 is inserted may be defined in the inner lid 220.

The coupling guide boss 224 and the coupling guide hole 244 may be defined at a preset position to oppose the first flow path guide member 410 to the second flow path guide member 420. Accordingly, when the coupling guide boss 224 is inserted into the coupling guide hole 244, the first flow path guide member 410 and the second flow path guide member 420 may be opposed to each other and may be disposed at positions corresponding to each other, and the steam flow path may be defined between the inner lid 220 and the inside lid 240.

As described above, according to the present disclosure, convenience in coupling between the inside lid 240 and the inner lid 220 may be provided to define the steam flow path through the coupling guide boss 224 and the coupling guide hole 244, so that the steam flow path may be generated at an accurate position.

Various substitutions, modifications, and changes can be made within the scope that does not deviate from the technical idea of the present disclosure for the skilled person in the art to which the present disclosure pertains, the above-mentioned disclosure is not limited to the above-mentioned implementations and the accompanying drawings.

Other implementations are within the scope of the following claims.

What is claimed is:

1. An electric pressure cooker, comprising:
   a main body that defines a cooking space, the main body having an upper surface that defines a body opening;
   an inner pot configured to be accommodated in the cooking space, the inner pot having an upper surface that defines a pot opening;
   a lid fastening ring configured to be fastened to the upper surface of the main body;
   an inner lid that is disposed radially inside of the lid fastening ring and that is configured to block the upper surface of the inner pot, the inner lid comprising a steam outlet and a first flow path guide member that are disposed at a lower surface of the inner lid; and
   an inside lid configured to be coupled to the lower surface of the inner lid, the inside lid comprising a second flow path guide member disposed at an upper surface of the inside lid,
   wherein the inner lid and the inside lid define a steam flow path by the first flow path guide member and the second flow path guide member, the steam flow path being configured to guide steam generated in the inner pot to the steam outlet, and
   wherein the second flow path guide member comprises a depression that extends downward from the inside lid and is recessed downward relative to a lower surface of the inside lid, the depression being integrally formed with the inner lid and having an unperforated surface that separates the steam flow path from the cooking space.

2. The electric pressure cooker of claim 1, further comprising an inner pot packing that is configured to be installed to the inner lid along a circumference of the inner pot, the inner pot packing being configured to cover a space between the inner lid and the inner pot.

3. The electric pressure cooker of claim 1, wherein the main body comprises a body fastening ring disposed at the upper surface of the main body, and
   wherein the lid fastening ring is configured to be rotationally fastened to the body fastening ring.

4. The electric pressure cooker of claim 3, wherein the main body defines a fastening groove in the body fastening ring, and
   wherein the lid fastening ring is configured to be inserted into the fastening groove and then rotated relative to the body fastening ring to thereby be fastened to the body fastening ring.

5. The electric pressure cooker of claim 4, wherein the lid fastening ring comprises a plurality of engaging portions, and
   wherein the body fastening ring comprises a plurality of guide protrusions that are configured to, based on the lid fastening ring being inserted into the fastening groove and then rotated relative to the body fastening ring, engage with the plurality of engaging portions, respectively.

6. The electric pressure cooker of claim 1, further comprising:
   a steam exhauster disposed at an upper surface of the inner lid and configured to discharge steam to an outside of the electric pressure cooker according to a user command.

7. The electric pressure cooker of claim 1, further comprising:

a pressure controller disposed at an upper surface of the inner lid and configured to discharge steam to an outside of the electric pressure cooker based on a pressure of steam introduced through the steam outlet exceeding a preset pressure.

8. The electric pressure cooker of claim 1, further comprising:
a fastening boss disposed at the lower surface of the inner lid; and
a packing member disposed in the inside lid,
wherein the inside lid is configured to be coupled to the lower surface of the inner lid based on the fastening boss being inserted through the packing member.

9. The electric pressure cooker of claim 1, wherein the first flow path guide member comprises a flow path guide wall that protrudes from the lower surface of the inner lid and that is configured to contact the upper surface of the inside lid, the flow path guide wall being curved to define the steam flow path in a horizontal zigzag shape.

10. The electric pressure cooker of claim 1, wherein the first flow path guide member comprises a first flow path guide wall that protrudes downward from the lower surface of the inner lid, and
wherein the second flow path guide member further comprises a second flow path guide wall that protrudes upward from the upper surface of the inside lid.

11. The electric pressure cooker of claim 1, wherein the first flow path guide member comprises a first circular flow path guide wall that protrudes downward from the lower surface of the inner lid, and the first circular flow path guide wall having a first radius,
wherein the second flow path guide member further comprises a second circular flow path guide wall that protrudes upward from the upper surface of the inside lid and that is concentric with the first circular flow path guide wall, the second circular flow path guide wall having a second radius different from the first radius, and
wherein the first circular flow path guide wall and the second circular flow path guide wall define the steam flow path in a vertical zigzag shape.

12. The electric pressure cooker of claim 11, wherein the steam outlet extends along a vertical line, and
wherein a center of the first circular flow path guide wall and a center of the second circular flow path guide wall are defined in the vertical line.

13. The electric pressure cooker of claim 11, wherein a lower end of the first circular flow path guide wall is spaced apart from the upper surface of the inside lid, and
wherein an upper end of the second circular flow path guide wall is spaced apart from the lower surface of the inner lid.

14. The electric pressure cooker of claim 1, wherein the first flow path guide member comprises a spiral flow path guide wall that has an inlet defined at one side, that protrudes from the lower surface of the inner lid, and that is configured to contact the upper surface of the inside lid, the spiral flow path guide wall having a first radius,
wherein the depression has a circular shape that is concentric with the spiral flow path guide wall, the depression having a second radius less than the first radius, and
wherein the spiral flow path guide wall and the depression define the steam flow path in a spiral shape.

15. The electric pressure cooker of claim 14, wherein a center of the spiral flow path guide wall is defined at the steam outlet.

16. The electric pressure cooker of claim 1, further comprising:
a coupling guide boss that protrudes from the lower surface of the inner lid,
wherein the inside lid defines a coupling guide hole configured to receive the coupling guide boss, and
wherein the first flow path guide member and the second flow path guide member define the steam flow path based on the coupling guide boss being inserted into the coupling guide hole.

17. The electric pressure cooker of claim 16, further comprising:
a fastening boss disposed at the lower surface of the inner lid and spaced apart from the coupling guide boss; and
a packing member disposed in the inside lid and configured to receive the fastening boss.

18. The electric pressure cooker of claim 17, wherein the coupling guide boss is disposed radially outward relative to the fastening boss at the lower surface of the inner lid.

19. The electric pressure cooker of claim 1, wherein the steam outlet comprises a plurality of steam outlets spaced apart from each other, and
wherein the steam flow path passes through at least one of the plurality of steam outlets.

20. The electric pressure cooker of claim 1, wherein the first flow path guide member and the second flow path guide member are configured to, based on the inner lid and the inside lid being coupled to each other, be horizontally or vertically spaced apart from each other to thereby define the steam flow path therebetween.

* * * * *